Patented Apr. 27, 1937

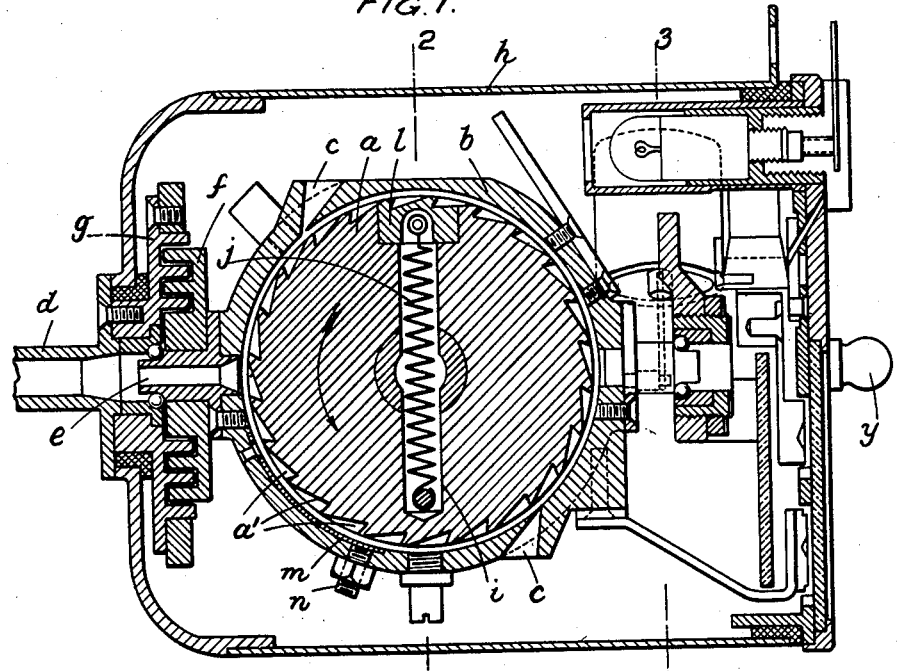
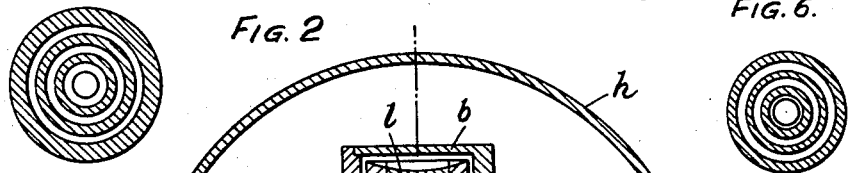
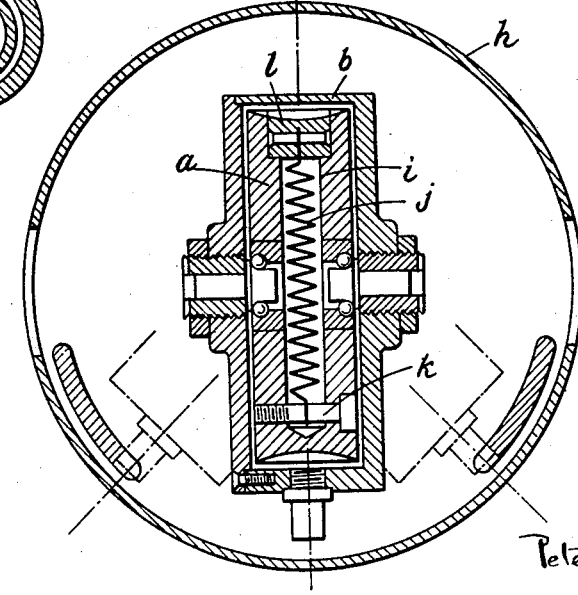

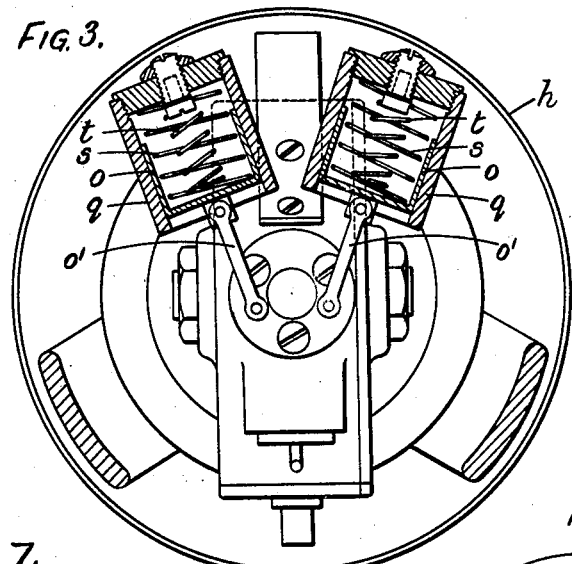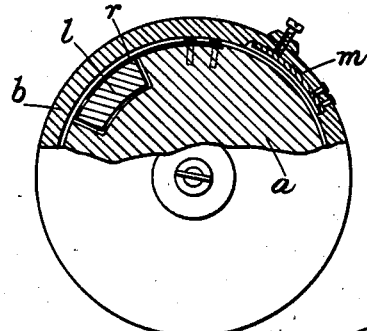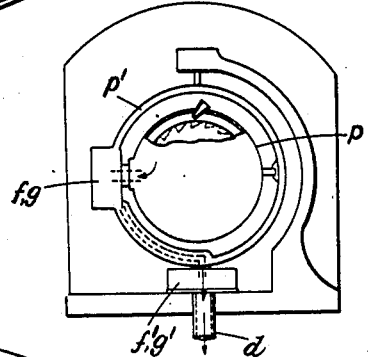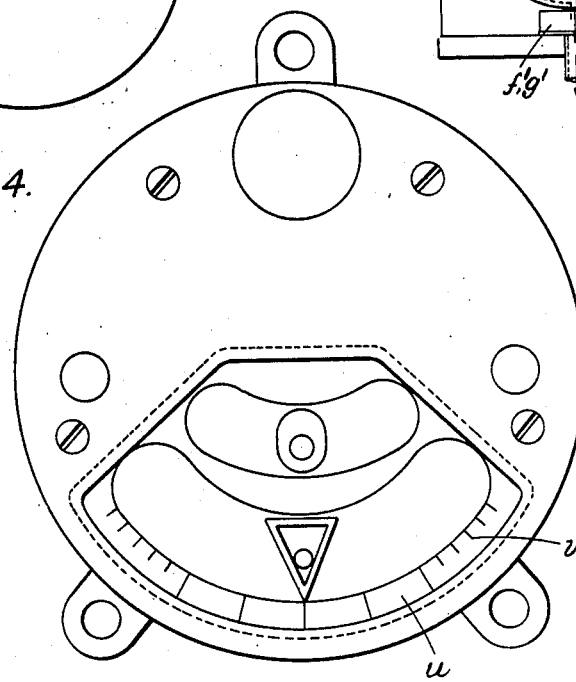

2,078,734

UNITED STATES PATENT OFFICE 2,078,734

GYROSCOPIC APPARATUS

Peter Schilovsky, London, England

Application May 31, 1934, Serial No. 728,296
In Great Britain May 31, 1933

5 Claims. (Cl. 33—204)

This invention relates to a new class of gyroscopic apparatus signalling quantitatively the angular velocities of a progressing body round its vertical axis and has for its main object to ensure a constant speed of rotation of the gyroscope wheel or disc and therefore a constant value of gyroscopic reaction upon external couples applied to the gyroscope frame. Without this condition gyroscope steering instruments can only be qualitative devices and not quantitative and it is not otherwise possible to produce a rate-of-turn indicator, since this pre-supposes that all elements upon which the gyroscopic precision depends, including speed of rotation, are of constant value.

The aims and the nature of quantitative rate of turn indicators are different and superior to those of common turn indicators. The latter signal only the deviation of the plane from the straight course and help the pilot to fly straight in obscurity and in mist. The rate of turn indicator shows also those deviations, but at the same time it fulfills a new function of great importance; it states what kind of curve the aeroplane or a set of airplanes flying in formation accomplish when the instrument pointer or the respective pointers on all planes show the first, second, third, etc. graduation of the scale. Or, dealing from the point of navigational practice of flights in formation, it indicates to the pilots that for turning all the planes in harmonical symmetry, say to 180°, the pilots have to keep at a given signal and command their pointers either 40 seconds on the first division for making a slow turn, or 20 seconds on the second division for making a sharper curve, or say 7 seconds on the third division; accordingly the pilots must work the steering mechanisms. The two or three accepted rates of turn standardize those manipulations of the rudders and ailerons for required angular speeds, an advantage which cannot be under-appreciated also in practice of single flights in blind flying navigation.

As is well known, varying air pressures and changes in the lubricant's viscosity produced by variation of temperature render the rotation of common gyros non-constant. No common turn indicator including such as is disclosed in the U. S. Patent No. 1,900,709 to Henderson can be therefore used for guiding single planes or planes in formation, and the new quantitative instrument ascertaining constant values to factors generating the precession of the gyro constitute a separate and new class of navigational instruments.

According to the present invention, constancy of speed of the gyro wheel is obtained by providing the gyroscope with a centrifugal braking device the co-operating elements of which are mounted respectively on the gyro wheel and the gimbal frame in which the gyroscope wheel is journalled, and this frame constitutes an airtight contour casing around the gyro wheel from which air is sucked preferably through a frictionless bearing and labyrinth seal, the outer part of which is stationary and connected with an exhausting device, whilst the inner part is fixed to and rotates with the gyro contour casing. It must be borne in mind that the well-known system of air-tight casing over the whole instrument and of driving the gyros "mounted therein for precession about an axis", as explained and illustrated in Patent 1,407,491, by means of nozzles fixed to the instrument's stand cannot be used; it imparts oblique strokes on buckets when the gyro has tilted and either increases the precessional deviation or reduces it. According to the present invention the area of vacuum or reduced pressure is restricted to the freely journalled contour casing, all the other parts of the mechanism of the instrument being located in free air, whilst, the nozzles whereby the jets of air are directed against the buckets around the periphery of the gyro wheel are mounted in the gyro wheel contour casing, so that the direction of these jets of air with respect to the wheel buckets remains the same under all conditions.

Such an apparatus can be used to measure quantitatively angular velocities in general, the accuracy of such indications of measurements being insured by providing upon the gyroscope itself a controlling device in the form of a centrifugal governor which, at a predetermined speed of rotation, brings into operation a braking device which ensures that this speed of rotation will not be exceeded.

These and other features of the invention are more specifically described herein with reference to the acompanying drawings, wherein Fig. 1 is a central longitudinal section of a rate-of-turn indicator embodying the invention; Fig. 2 is a section on line 2—2 of Fig. 1; Fig. 3 is a section on line 3—3 of Fig. 1; Fig. 4 is a front elevation; Figs. 5 and 6 are detail views showing in section the two elements of the labyrinth bearing; Fig. 7 is a view showing a modified form of centrifugal brake; and Fig. 8 an elevation, with parts broken away, showing a gyroscope mounted for three degrees of freedom.

As shown in these drawings the gyroscope wheel $a$ is rotated in an air-tight casing $b$ which closely embraces the wheel and also constitutes its gimbal frame. The nozzles $c$ through which the jets of air are directed upon the buckets $a'$ around the periphery of the gyro wheel are mounted in the gyro contour casing $b$ and consequently, swinging with the casing and the wheel as they do, the direction of the air from these nozzles against the buckets remains unaltered during precessional movements of the gyro. The air within the casing $b$ is exhausted by connecting the interior of this casing with a Venturi tube or pump or equivalent exhausting device which is connected with a fixed tube $d$ leading to the hollow journal $e$ of the casing or gimbal $b$. The hollow axle $e$ is supported in ball bearings and has secured upon it a disc $f$ which has a series of concentric grooves formed upon it and constitutes one element of the labyrinth. The other element of a labyrinth seal is constituted by the fixed disc $g$ having on its face a series of concentric ribs which fit closely within the grooves on the disc $f$ without touching them. By these means a substantially frictionless bearing is obtained while rendering it possible to use nozzles swinging with the gyro wheel instead of, as has hitherto been the case in turn indicators, using fixed nozzles. In apparatus according to the present invention the outer casing $h$ is not and must not be air-tight.

It will also be understood that the suction due to the exhausting device (not shown in the drawings) which is connected with the tube $d$ creates immediately the necessary vacuum within the gyro wheel contour casing $b$, whilst in instruments covered by an air-tight casing a certain time is required to produce the vacuum sufficient for obtaining the jets of air driving the gyro.

Centrifugal brakes in the form of separate rotating devices coupled to the axles of the machines are already used in practice for different power generating engines fixed to the ground as e. g. turbines, electrical motors, gramophones, etc. They were, however, never used on gyroscopes; the peculiarity of a gyroscope is that it must freely rotate round its axes of suspension, and the braking effect must not interfere in any way with gyro's precession. Furthermore, fast speed gyroscopes, in order to avoid noxious reactions of air friction, must constitute a highly symmetrical disk, and the location of controlling devices anywhere except inside its rotating mass greatly limited in dimensions presents a difficult problem.

The cooperating fixed element of the braking device may consist of a friction block or blocks forming part of or secured to the gyro wheel casing and balanced with respect to the pivots of the casing so as not to interfere with the equilibrium of the gyro. Such a braking device is operative during any precessional movement of the gyro, irrespective of its angle of deviation from the normal position, and in no way affects the normal operation of the gyroscope.

Referring again to the drawings, particularly Figs. 1 and 2, a bore or tunnel $i$ is drilled diametrically through the gyro disc $a$ and within this is a strong spring $j$ anchored at one end to a screw $k$ passing transversely through the disc and through one end of the diametral bore hole. The other end of the spring has attached to it a mass $l$ guided for radial movement in the diametral bore in the gyro disc. Normally this mass does not extend beyond the circumference of the gyroscope disc, but when the speed of rotation exceeds a predetermined value centrifugal force urges the mass $l$ outwardly against the tension of the spring $j$ to bring the outer face of the mass into rubbing contact with one or more brake shoes $m$ forming part of or secured to the interior surface of the gyro wheel casing $b$.

By making the braking shoe or shoes adjustable, as for example by means of a regulating screw $n$ screwed into the casing $b$ and impinging against the rear face of the braking shoe, the speed which it is desired to maintain constant may be varied. The parts forming the braking block or blocks are mutually equilibrated with respect to the axis of suspension of the gyroscope wheel casing or gimbal $b$.

Obviously, the centrifugally actuated frictional brake may take other forms such as, for example, that which is shown in Fig. 7 of the accompanying drawings, in which the radially guided mass $l$ is accommodated in a cavity in the periphery of the gyro wheel $a$ and is subject to the restraining action of a leaf spring $r$ secured to and shaped in accordance with the periphery of the gyro wheel. The retarding friction is produced by contact between the outer surface of the spring $r$ and the inside of the gyro wheel casing $b$, or alternatively the inside of one or more brake blocks $m$ adjustably mounted within the casing $b$.

It will be understood that the invention may be applied not only to turn-indicators but to driving, and controlling the speed of rotation of, any gyroscope, whether single or two-framed, being applicable to all apparatus utilizing the precessional torque of the gyroscope in any way, not excluding gyroscopic apparatus designed to indicate a definite direction in space.

Thus, in Fig. 8 is illustrated a gyroscope according to the present invention with three degrees of freedom, being supported in two gimbal frames $p$ and $p'$, the inner gimbal frame $p$ being constituted by an air-tight casing closely surrounding the gyro wheel and carrying the air jet nozzles for effecting the rotation of the wheel, as hereinbefore described. In this case it is of course necessary to provide two sets of frictionless bearings and labyrinth seals, namely one set $f$, $g$ connecting the gyroscope wheel contour casing or gimbal $p$ with the second gimbal frame $p'$ and a second frictionless bearing and labyrinth seal $f'$, $g'$ connecting the second gimbal $p'$ with the fixed tube $d$ leading to the device for exhausting the air from the gyro wheel contour casing.

The precessional movements of the gyro are damped in the known way by means of one or more elongated pistons $o$ of large diameter working loosely in cylinders $q$ and connected with suitable points on the gimbal frame by means of links $o'$, see Fig. 3. The restoring couple operating when the gimbal frame or casing $b$ is displaced from its normal or zero position, is derived from a spring or springs which are put in compression by the movement of the piston $o$. In the preferred form two springs are provided for each piston arranged concentrically with each other and with the piston and its cylinder. One of these springs, namely the outer spring $s$, is a light spring which experiences compression upon the smallest deviation of the gyro from its zero position, whilst the other spring $t$ is of shorter length and preferably also of greater resistance and does not come under compression until the deflection of the gyro is considerable, say, one half its full range. When the gyro reaches this position, the increased precessional deflection due to the increase of angular velocity of the moving body is resisted by both springs.

It is thus possible in this instrument to have two quantitative scales, one scale $u$ (see Fig. 4) for small or slow turns, and the other scale $v$ for greater or quicker turns. It will be understood that any suitable means may be used for illuminating the scales to facilitate reading their indications in a bad light.

Having thus described the nature of the said invention and the best means I know for carrying the same into practical effect, I claim:—

1. An apparatus for measuring angular velocities, comprising a gyroscope having the following features in combination, namely, an air driven gyro wheel, a gimbal frame therefor in the form of a casing closely surrounding said wheel, and a centrifugal braking device, the co-operating elements of which are an element mounted on the gyro wheel, and the inside of said casing.

2. An apparatus for measuring angular velocities, comprising a gyroscope having the following features in combination, namely, an air driven gyro wheel, a gimbal frame in the form of a casing closely surrounding said wheel, a centrifugal braking device the co-operating elements of which are an element mounted on the gyro wheel, and the inside of said casing, and means for resisting precession of the gimbal frame, said means comprising two springs coming successively into operation.

3. A gyroscopic navigational instrument for measuring angular velocities quantitatively comprising in combination an air driven gyro wheel having buckets on its periphery, an air-tight casing closely surrounding said wheel and provided with air nozzles directed towards said buckets in constant relation therewith, a centrifugal brake one element of which is incorporated in the body of said wheel and operates at a predetermined circumferential velocity of the latter against the inside of said casing, horizontal trunnions for said casing having their common axis at right angles to the axis of the gyro wheel, frictionless bearings for said trunnions, a labyrinth seal around one of said bearings, one of said trunnions being hollow and constituting a passage leading from the interior of the said contour casing to an evacuating device, spring means operating to apply a restoring couple to the said casing about its trunnion axis, and means for indicating quantitatively the angular velocities imparted to the instrument with respect to an axis at right angles to the axes of the gyro wheel and of the trunnions of the casing surrounding said wheel.

4. An apparatus for measuring angular velocities, comprising a gyroscope having the following features in combination, namely, an air driven gyro wheel, a gimbal frame therefor in the form of a casing closely surrounding said wheel, a centrifugal braking device the co-operating elements of which are an element mounted respectively on the gyro wheel and the inside of said casing, and a frictionless bearing and a co-operating labyrinth seal for said gimbal frame, said bearing being provided with an air passage leading from the interior of said frame through said bearing and seal to an evacuating device.

5. A turn indicator comprising a gyroscope having an air driven gyro wheel formed on its circumference with buckets, a freely journalled contour casing surrounding said wheel and formed with air nozzles constantly directed against said buckets so that the direction of the jets of air with respect to the buckets remains the same under all conditions and a labyrinth bearing for said casing and through which the air from the casing is exhausted, the area of reduced pressure being confined within said casing.

PETER SCHILOVSKY.